United States Patent [19]
Sato et al.

[11] 3,757,329

[45] Sept. 4, 1973

[54] SYSTEMS FOR MEASURING VELOCITIES OF MOVING BODIES

[75] Inventors: Kazuo Sato; Hisashi Watanabe, both of Toyota-shi, Japan

[73] Assignee: Toyota Jidosha Kogyo Kabushiki Kaisha, Tokyo, Japan

[22] Filed: Mar. 1, 1971

[21] Appl. No.: 119,465

[30] Foreign Application Priority Data
July 23, 1970 Japan.............................. 45/63976

[52] U.S. Cl.................................. 343/8, 343/7 ED
[51] Int. Cl............................................. G01s 9/44
[58] Field of Search ............................ 343/7 ED, 8

[56] References Cited
UNITED STATES PATENTS 3,212,083 10/1965 Hinchman.................... 343/7 ED X
3,474,444 10/1969 Okamoto......................... 343/7 ED Primary Examiner—T. H. Tubbesing
Attorney—Toren & McGeady

[57] ABSTRACT

In the system disclosed a random noise signal frequency-modulates a Doppler radar. More specifically the relative velocity between moving bodies or between a moving body and a fixed object is measured by transmitting an undulatory signal toward the body and receiving the reflected wave whose frequency has been shifted by the Doppler effect. The Doppler signal is detected by a homodyne detection system using a portion of the transmission signal as a reference. The transmitted undulatory signal exhibits frequency-modulation generated by a random noise signal. A portion of the frequency modulated undulatory wave is used as a reference. The frequency modulation by the random noise prevents erroneous operation caused by interference between different transmitted undulatory signals.

10 Claims, 3 Drawing Figures

SYSTEMS FOR MEASURING VELOCITIES OF MOVING BODIES

BACKGROUND OF THE INVENTION

This invention relates to systems for measuring the velocities of moving bodies, particularly where the relative velocity between moving bodies or between a moving body and a fixed object is measured by means of the Doppler effect upon undulatory signals. The invention has special, although not exclusive, relevence to systems which measure the relative velocities of vehicles such as automobiles, to sense impending collisions.

It is generally known that when undulatory energy such as sound waves, electromagnetic waves, or the like, is radiated from one position and encounters an object having a velocity component toward or away from the source, the frequency of the wave reflected from the object is shifted with respect to the frequency of the transmitted wave. This is known as the Doppler effect. It is used in so-called Doppler radars.

If the frequency of a wave transmitted from one object is $f_t$; the velocity of propagation of undulator energy $c$; and the relative velocity between a transmission source and a body, either toward or away from the source, $v$; then the frequency $f_r$ of the received wave will be defined as $$fr = [(c + v)/(c - v)] f_t$$

The frequency $f_d$ of the Doppler signal, which represents the difference between $f_t$ and $f_r$ that results from the Doppler effect has the value $$f_d = f_t - f_r \approx (2 f_t v/c)$$

The velocity $v$ is measured directly by setting the frequency $f_t$ of the transmission wave, and the propagation velocity $c$, so that they represent constant values.

Velocity measuring systems using this Doppler principle may, for example, be composed of a high frequency energy generator, a circulator having an antenna, a homodyne detector and a low pass filter. In such a system the circulator successively radiates a constant-frequency transmission wave produced by the generator, through the antenna, toward an oncoming or receding object. At the same time, the circulator receives the wave reflected from the oncoming object. The frequency of the reflected wave is shifted by the Doppler effect. The homodyne detector utilizes a reference signal, that is a local oscillator signal, formed from part of the energy of the transmission wave extracted from the circulator. The homodyne produces a Doppler signal having a frequency proportional to the relative velocity, by mixing and detecting the reference signal and the received wave. Consequently, in the homodyne detection system as described above, a significant Doppler signal is detected only where a transmission wave is formed as an intrinsic function of the system.

However, frequencies of transmission signals usable in such measuring systems are limited by their characteristics. Thus the frequency bands usable are inevitably limited. If these frequencies are used as a collision sensing apparatus in vehicles such as automobiles, and such means are mounted on a vast number of vehicles, it is possible that transmission waves from several vehicles may overlap. Thus, two transmission waves from vehicles may interfere with each other and the frequency difference between two transmitted waves may become equal to the frequency of the Doppler signal to be detected. Then a Doppler signal may result, as if two vehicles were moving toward each other, even when there is no actual motion. This results in undesirable erroneous operation.

An object of the invention is to improve systems, such as Doppler radars, of this type.

Another object of this invention is to eliminate the above described erroneous operation caused by interference of transmission waves.

Still another object of the invention is to accomplish this simply without complex equipment.

SUMMARY OF THE INVENTION

According to a feature of the invention these deficiencies of prior systems are obviated, and the objects obtained, by frequency-modulating the transmission wave irregularly with a random noise signal and detecting the Doppler signal by using a portion of the energy from the transmission wave as a reference signal.

By virtue of this feature the likelihood of interference between waves transmitted by several sources may be reduced.

According to another feature of the invention the modulation frequency and modulation index of the transmitting signal are determined in accordance with the frequency components of the random signal.

According to still another feature of the invention limiting means limit the frequency range of the modulation of the transmitted signal.

According to still another feature of the invention this limiting function is accomplished by a band pass filter.

According to still another feature of the invention low-pass filter means limit the frequency excursion of the Doppler signal.

These and other features of the invention are pointed out in the claims. Other objects and advantages of the invention will become obvious from the following detailed description when read in light of the accompanying drawing.

BRIEF DESCRIPTION OF THE DRAWING

FIG. 2b is a frequency-time diagram illustrating an enlarged form of a portion of FIG. 2a.

DESCRIPTION OF PREFERRED EMBODIMENTS

Figure 1:
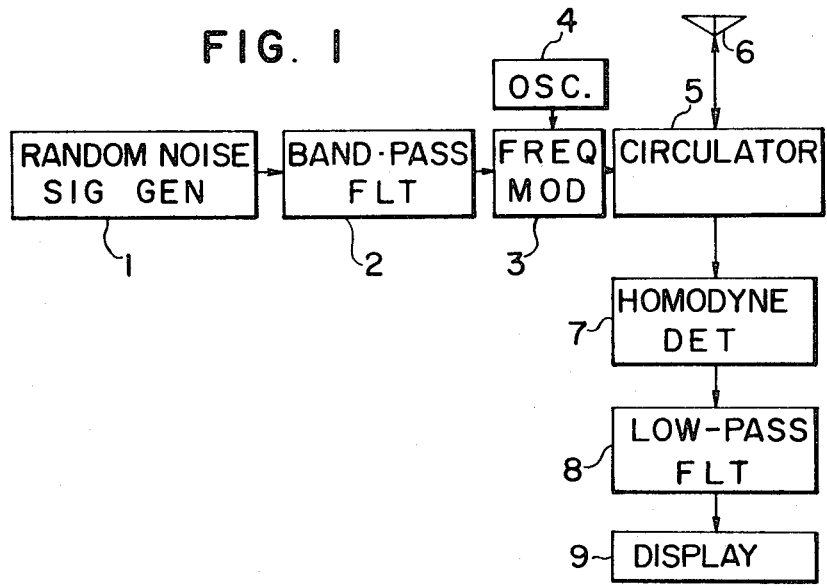
FIG. 1 is a block diagram illustrating a system embodying features of the invention.

In FIG. 1, a random noise signal generator 1 produces random wave forms whose frequency spectrum is limited by a band pass filter 2. A frequency-modulator 3 modulates the output frequency generated by an oscillator 4 in accordance with the band-pass-filter modified random noise signals from the generator 1, and applies the thus frequency-modulated signal to a circulator 5. The characteristics of the filter 2 establish the modulation frequency band and the magnitude of the frequency deviation. A circulator 5 applies the thus frequency-modulated transmission signal to an antenna 6. The latter radiates the signal in the form of a transmission wave toward an oncoming object along a predetermined direction. The frequency shifted wave reflected from the oncoming object is received by the antenna.

Circulators, such as the circulator 5, are discussed in the McGraw Hill Encyclopedia of Science and Technology 1966 Edition, Volume 8, page 418 as well as Volume 6 pages 302 to 305. Other types of duplexers and antenna systems may be substituted for the circulator 5 and the antenna 6.

While the frequency-modulated wave is being transmitted and the frequency shifted wave reflected, part of the frequency modulated transmission wave or transmission signal is utilized as a reference signal in a homodyne detector 7. The latter forms a Doppler signal in response to the frequency-modulated transmission wave and the frequency shifted wave in conventional manner.

As described above, the system according to this invention produces a transmission wave as well as a frequency deviated wave whose frequencies have been modulated with the irregularity inherent in a random signal at a selected modulation index.

A low-pass filter 8 limits the frequency spectrum of the Doppler signal passing from the homodyne detector 7 to a display 9. The low-pass filter in effect limits the frequency shifts displayed by the display 9 to a maximum frequency shift. The display 9 according to one embodiment of the invention constitutes a frequency counter. According to another embodiment of the invention the display 9 is a frequency-voltage converter that displays the frequency in the form of a DC voltage value.

The system of FIG. 1 operates as follows. The modulation frequency (random noise signal frequency band) and the frequency shift of the output frequency generated by the oscillator 4 are selected in the frequency modulator 3 by means of the output of the random noise signal generator 1. This frequency is modulated by setting a specific value conforming to the height of the modulation frequency and the magnitude of the frequency deviation according to the filter characteristics of the band-pass filter 2. The thus frequency-modulated transmission signal is applied by a circulator 5 to an antenna 6 which radiates the signal as a transmission wave form in a predetermined direction toward an oncoming object. The antenna receives a frequency shifted wave reflected from the oncoming object. The circulator 5 applies the received signal to the homodyne detector 7. At the same time part of the frequency-modulated transmission signal or wave is applied as a reference signal to the homodyne detector in conventional manner. The homodyne detector mixes and converts the two frequencies into a beat frequency, or Doppler signal. The frequency of the Doppler signal is approximately proportional to the velocity component of the object in the direction of the antenna. For an oncoming object or a receding object traveling radially with respect to the antenna the relative velocity is proportional to the Doppler frequency.

The range of velocities represented by Doppler frequencies which are used in the display 9 is limited at an upper level by the low-pass filter 8. The display 9 may also constitute a utilization circuit. The system of FIG. 1 is capable of obviating the effects of interference between a reflected wave form and one or more other wave forms transmitted by other transmitters in the same frequency band. Reception of such multiple signals may occur if several automobiles in one vicinity each possess a Doppler radar corresponding to the radar system of FIG. 1 and each operates at overlapping frequency bands. The apparatus of FIG. 1 even avoids problems occurring when there is no reflected signal and two transmitted signals in the same frequency band are received from other antennae by the antenna 6.

Figure 2A:
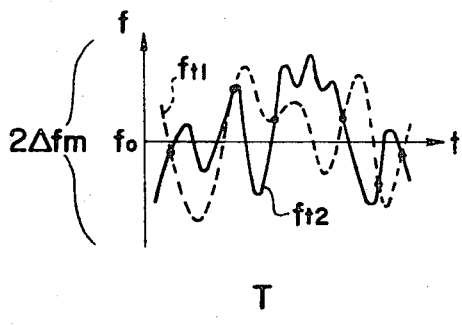
FIG. 2a is a frequency-time wave form diagram illustrating the changes in the transmitted frequencies of two systems embodying features of the invention.
Figure 2B:
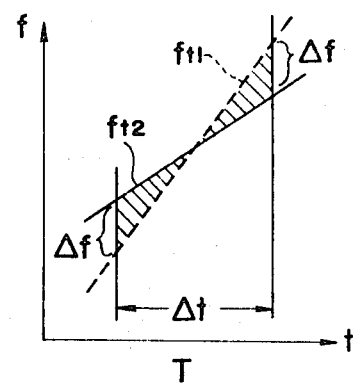

FIG. 2a illustrates two transmitted wave forms $f_{t1}$ and $f_{t2}$ having the same center frequency $f_0$ which are irregularly varied with respective natural random noise signals within the maximum frequency deviation $2\Delta f_m$ established by a modulation index. With such two signals there is a possibility that the frequency difference between the two waves $f_{t1}$ and $f_{t2}$ may at times lie within the frequency range of Doppler signals detected, namely those passed by the low-pass filter 8, and cause interference. Such interference would normally occur as shown in FIG. 2b when the frequency difference $\Delta f$ is measured near the coincidence points of the two transmission waves $f_{t1}$ and $f_{t2}$. However, because both transmission waves $f_{t1}$ and $f_{t2}$ are randomly frequency-modulated, the time $\Delta t$ during which an apparent Doppler signal is obtained in the Doppler signal frequency band is comparatively small. The aspect of the change in the frequency difference $\Delta f$ as well as the time $\Delta t$ during which interference continues and the time intervals at which the interference is developed, namely the frequency of occurrence, are controlled by the modulation frequency and the frequency deviation. As a result the Doppler signal developed by the interference is not sufficiently long and does not occur often enough to affect the display 9 significantly.

The modulation frequency and the frequency deviation selected by the random noise signal are determined to produce an interference time $\Delta t$ that constitutes a negligibly short time with respect to the variations in the relative velocity to be detected. In other words, the modulation frequency and frequency deviation are selected to obtain a rapid frequency change speed which cannot be produced by a moving body. Thus the apparent Doppler signal developed by mutual interference is easily separated from the true Doppler signal detected only by the systems own transmission wave.

The specific value determined by the band-pass filter characteristics is established so as to apply to such cases where interference occurs frequently due to the increase in modulation frequency band or where the interference time $\Delta t$ is shortened due to the increase in magnitude of the frequency deviation.

As described above, according to the system of this invention, it is possible to convert a signal developed due to interference of transmission waves to a signal that is substantially insignificant. In this case, the oscillator may be substituted by Gunn effect oscillator for example.

The oscillator 4 used in the system of FIG. 1 may also serve as a modulator by superimposing the random signal directly on its bias voltage. Therefore, according to another embodiment of the invention the frequency modulator 3 is not required.

Also, there exists a time lag between the transmitted wave and the received wave. This is determined by the propagation velocity. In utilizing the frequency modulated transmission wave as a reference signal according to the system of FIG. 1, the frequency of the reference signal changes during the propagation time lag. A beat wave due to the frequency difference is developed between the transmitted wave and the received wave. According to another embodiment of the invention the modulation frequency and modulation index is selected, on the basis of the range of distances to be measured, to develop a beat frequency band due to the propagation time lag which is distinct from the band of frequencies of the Doppler signal.

While embodiments of the invention have been described in detail it will be obvious to those skilled in the art that the invention may be practiced otherwise without departing from its spirit and scope.

What is claimed is:

1. A velocity measuring system, comprising energy generating means for continuously transmitting undulatory waves from one position and receiving object-reflected undulatory waves at a position fixed relative to the one position, frequency comparator means responsive to said generating means for combining the frequency of the transmitted wave with the frequency of the received wave to form a Doppler signal as a measure of velocity, and exclusion means for identifying the transmitted undulatory waves so as to exclude velocity measurement with extraneous signals, said exclusion means including modulating means forming a part of said generating means for continuously modulating the transmitted signal on a random basis.

2. A system as in claim 1, wherein said modulating means include frequency changing means for modulating the frequency of the transmitted signal.

3. A system as in claim 2, wherein said modulating means include limiting means for limiting the frequency range of the modulation of the transmitted signal.

4. A system as in claim 1, wherein said modulating means include random signal generating means having band-pass filter means for controlling the frequency output of said random generating means, and a modulator responsive to the output of said band-pass filter means.

5. A system as in claim 1, wherein said comparator means includes low-pass filter means for limiting the frequency of the Doppler signal.

6. A system as in claim 5, wherein said generating means include oscillator means for forming an alternating signal; wherein said modulating means includes random signal forming means for forming random signals, band-pass filter means for limiting the frequency range of the random signals, and a modulator responsive to said band-pass filter means and connected to said generator means for modulating the transmitted signal over a frequency range determined by said band-pass filter.

7. A velocity measuring system, comprising oscillator means for generating an undulating wave signal, frequency modulating means responsive to said oscillator means for randomly frequency-modulating the wave signal by a random noise signal which varies between predetermined frequencies, transmitting and receiving means coupled to said frequency modulating means for transmitting the frequency-modulated wave signal toward an oncoming object and for receiving the wave signal reflected by said oncoming object so that the wave signal received is a Doppler shifted, and homodyne detecting means coupled to said transmitting and receiving means for mixing the part of the transmitted wave signal as a reference signal with the reflected wave signal and detecting the frequency shift as a measure of the relative velocity of the oncoming object.

8. An apparatus as in claim 7, wherein said homodyne detecting means includes low pass filter means for limiting the frequency of the Doppler signal.

9. A system as in claim 7, wherein said frequency modulating means includes noise generator means, and band-pass filter means coupled to said noise generator means for establishing the predetermined frequencies between which the noise signal varies.

10. An apparatus as in claim 9, wherein said frequency modulating means includes a modulator responsive to said band-pass filter means.

* * * * *